April 7, 1970  JEAN-FELIX PAULSEN  3,504,509
RESILIENT COUPLING DEVICES
Filed Aug. 2, 1967  2 Sheets-Sheet 2

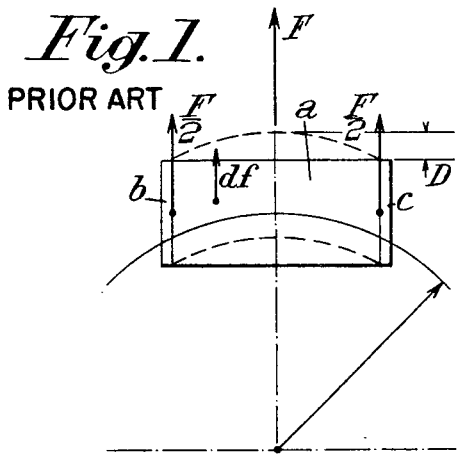
Fig.1. PRIOR ART
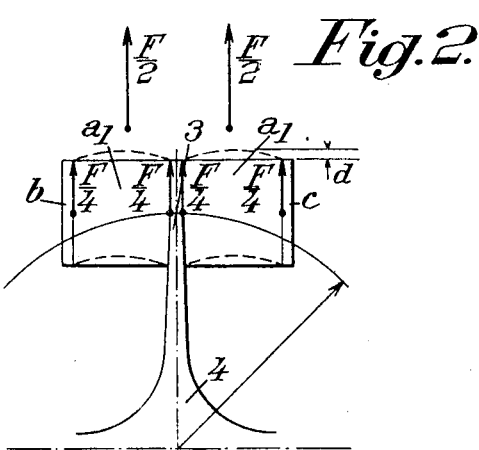
Fig.2.
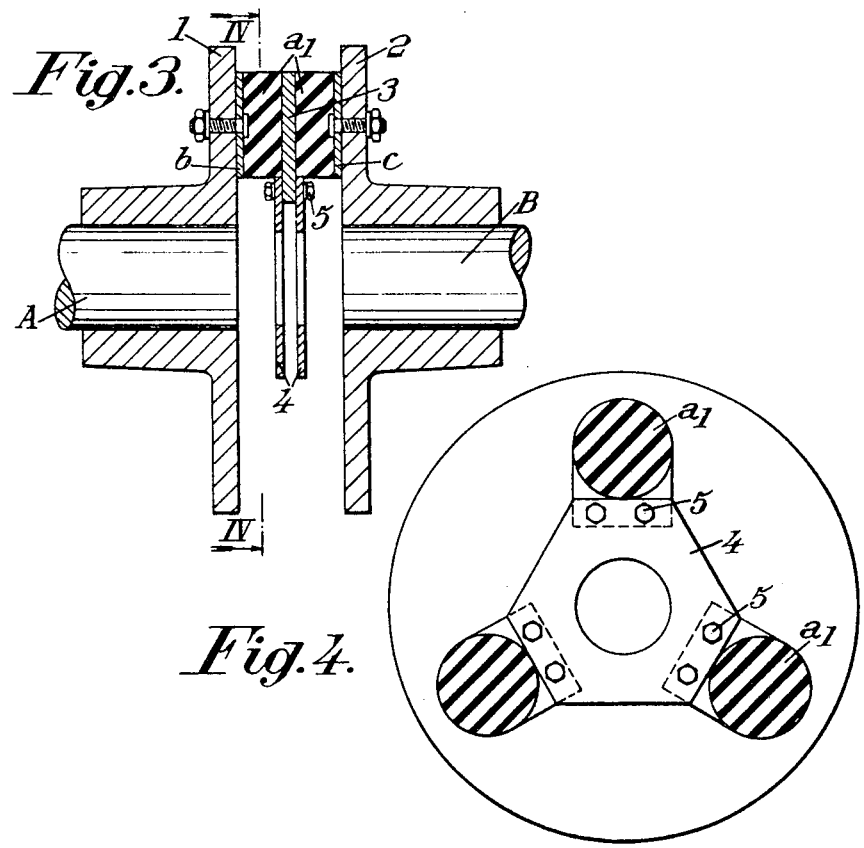
Fig.3.
Fig.4.

United States Patent Office 3,504,509
Patented Apr. 7, 1970

3,504,509
RESILIENT COUPLING DEVICES
Jean-Felix Paulsen, Chateaudun, France, assignor to Luxembourgeoise de Brevets et de Participations, Luxembourg, an organization of Luxembourg
Filed Aug. 2, 1967, Ser. No. 657,984
Claims priority, application France, Aug. 17, 1966, 73,309
Int. Cl. F16d 3/64
U.S. Cl. 64—14         5 Claims

ABSTRACT OF THE DISCLOSURE

A resilient coupling device to be interposed between two shafts in line with each other and which carry interfacing flange discs connected with each other through resilient blocks adhered alternately to said discs and forming an annular row, said blocks being either tangential to this row or parallel to the mean direction of the shafts, each of said blocks being divided into two elements adhered to a member mounted floating between the two flange discs.

---

The present invention relates to resilient coupling devices to be interposed between two shafts substantially in line with each other and provided with flange discs fixed thereto and facing each other, said discs being connected to each other through sets of resilient blocks, made of rubber or an elastomer, secured to said flange discs and distributed about the centers thereof.

The chief object of the present invention is to provide a coupling device of this type where the effects of the centrifugal force on said resilient blocks are reduced.

The invention consists chiefly in providing the sets of resilient blocks with an intermediate rigid member adhered to said blocks in an intermediate portion thereof and forming a floating element between the flange discs.

Preferred embodiments of the present invention will be hereinafter described with reference to the appended drawings given merely by way of example and in which:

FIG. 1 is a diagram illustrating the operation of known coupling devices;

FIG. 2 is a diagrammatic view illustrating the operation of a coupling device according to the present invention;

FIG. 3 is an axial sectional view of a first embodiment of a coupling device according to the present invention;

FIG. 4 is a transverse section on the line IV—IV of FIG. 3;

Figure 5:
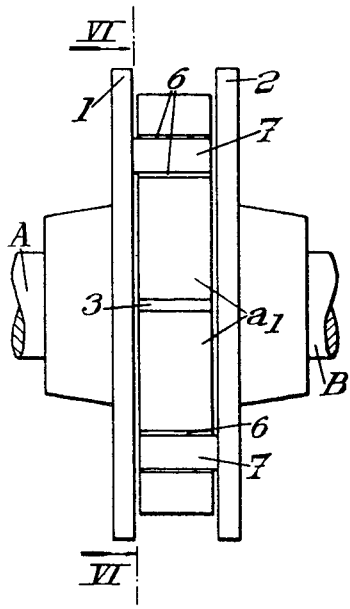
FIG. 5 is a side view of a coupling device made according to a second embodiment of the invention.

The conditions under which resilient blocks work in coupling devices of the kind with which the present invention is concerned will be briefly stated with reference to FIG. 1.

The resilient blocks $a$ are acted upon by the torque that is transmitted, and this, either by compression and pulling, in particular when said blocks are disposed tangentially with respect to the shafts, or by shearing, in particular when the resilient blocks are disposed parallel to the shafts. Anyway, said blocks have a possibility of deformation, and therefore a flexiblity under the effect of the torque transmitted thereto, which is the greater as the thickness of rubber under stress is greater.

But it should be noted that, under the effect of the rotation of the shafts, every elementary volume of the elastic material interposed between the rigid plate mountings is urged radially by a centrifugal force $df$, as shown by FIG. 1 where it has been supposed that block $a$ is disposed tangentially.

There is therefore produced, for every resilient block:

(1) A total centrifugal action F the halves F/2 of which are applied to the respective plates $b$ and $c$ of the block, and (2) For the block of elastomer material, and in view of the great deformability of this material, a centrifugal deformation in the form of an outwardly bent curve, this deformation being of amplitude D as shown by FIG. 1.

Both of these effects are detrimental, the first one due to the increase of the stresses on the adhered surfaces of the end plates, the second one due to the possible dangers of buckling of the resilient blocks, which are deformed but always subjected to the action of the transmitted torque. Of course, other things being equal, these effects are the greater as the prismatic rubber blocks are more elongated and this makes it necessary to reduce the speeds of rotation of such coupling devices.

In order to obviate these drawbacks, while preserving the advantages of the high torsional elasticity of such coupling devices resulting from a great distance between the end plates $b$ and $c$ of resilient blocks $a$, the arrangement according to the present invention is such:

That every resilient block is provided with at least one intermediate rigid plate 3, preferably at middistance between the end plates $b$ and $c$ of the block, the faces of said intermediate plate 3 being adhered to the elementary blocks $a_1$ (FIG. 2) thus provided, and That the whole of said intermediate plates or members, or at least one group of them, is integral with or secured to an intermediate rigid element 4 which is mounted floating in the interval between flange discs 1 and 2.

Owing to this arrangement, illustrated by FIG. 2, each of rigid end plates $b$ and $c$ and of rigid intermediate plate 3, urged radially by the centrifugal force F/4 relative to a resilient block element $a_1$, has its corresponding stress divided by 2.

Furthermore, the elastic outward bending of each elementary block $a_1$ has only a value $d$ averaging one quarter of that, D, of a single block such as illustrated by FIG. 1.

Consequently, the coupling device may be used with substantially higher speeds of rotation.

FIGS. 3 and 4 show the case of blocks disposed parallel to the shafts and subjected to shearing stresses.

In this embodiment of the invention, three pairs of elementary resilient blocks $a_1$ have their outer rigid plates $b$, $c$ secured to flange discs 1, 2 and intermediate plate 3 is interposed between the inner faces of said resilient blocks $a_1$ and adhered thereto, the three intermediate rigid plates 3 being secured at 5 to an intermediate member 4 made of two portions as visible on FIG. 3.

Figure 6:
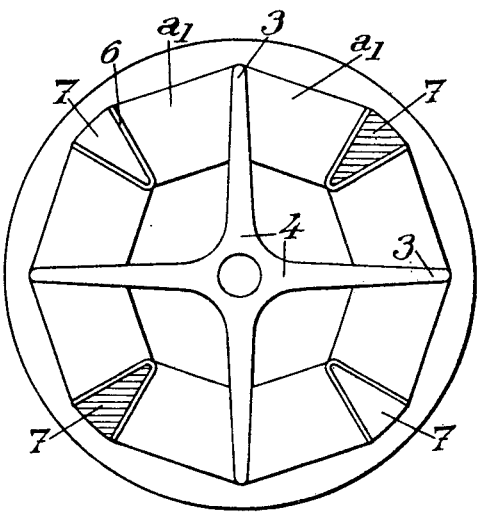
FIG. 6 is a cross sectional view on the line VI—VI of FIG. 5.
Figure 7:
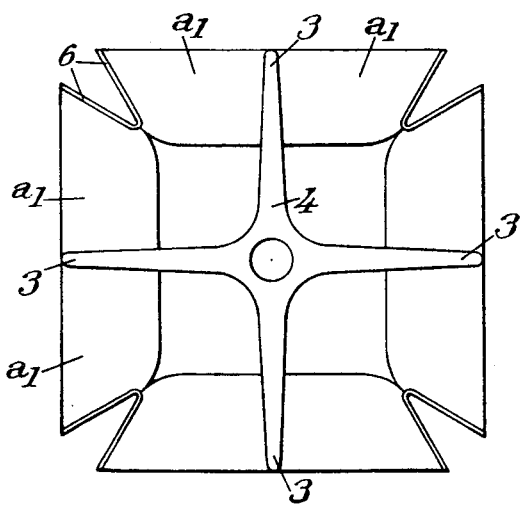
FIG. 7 shows the resilient blocks of FIG. 6 before their mounting.

FIGS. 5 to 7 inclusive show another embodiment of the invention corresponding to tangentially disposed resilient blocks, said blocks being advantageously prestressed.

In this case the sets of elementary blocks $a_1$, adhered at 3 to a cross-shaped member 4, bear on the other hand V-shaped rigid mountings 6.

Before assembly, the whole is as shown by FIG. 7, with the elements $a_1$ of each block at right angles to the elements $a_1$ of the adjacent blocks.

When the system is mounted, abutments 7 integral or rigid with the corresponding flange discs 1,2 cause a deformation of elements $a_1$, compressing them into the form illustrated by FIG. 6

Consecutive elements 7 are carried alternately by disc 1 and disc 2.

It should be well understood that this invention may include other features, such as means for centering intermediate floating member 4 with respect to shafts $a$ and $b$, such centering means including a single swivel connection if the respective axes of the shafts always intersect each other, or three swivel joints equidistant two by two if radial misalinements of the shafts are possible.

Such a reilient coupling has the advantage of reducing the effects of the centrifugal force and therefore of making it possible to use shafts revolving at higher speeds.

In a general manner, while the above description discloses preferred embodiments of the invention, it should be well understood that said invention is not limited thereto as there might be changes made in the arrangement, disposition and form of the parts without departing from the present invention.

What I claim is:

1. For use between two alined shafts having substantially a common axis and provided with respective flange discs located opposite each other, a resilient coupling device which comprises, in combination:
    at least two torque transmission sets symmetrically disposed about said common axis of said shafts, each set consisting of two resilient blocks located adjacent to each other and having adjacent and remote faces and means for securing the remote faces of said two resilient blocks to said flange discs, respectively, said blocks being distantly spaced from said common axis, and
    a floating member having its axis in coincidence with said common axis when said two sets of resilient blocks are symmetrically stressed, said floating member having at least two arms interposed between the adjacent faces of the resilient blocks of each of said two sets respectively and adhered thereto.

2. A resilient coupling according to claim 1, wherein the number of said torque transmission sets is four, distributed at equal angular intervals about said common axis, and said floating member is a cross-shaped member having four arms each located between the two resilient blocks of each of said sets, respectively.

3. A resilient coupling according to claim 1, wherein the number of said torque transmission sets is three, distributed at equal angular intervals about said common axis, and said floating member is a star-shaped member having three arms each located between the two resilient blocks of each of said sets, respectively.

4. A resilient coupling device according to claim 1, wherein the opposed remote faces of the two resilient blocks of each set are parallel to said flange discs and adhered thereto, said arms of the floating member being flat arms lying in a plane transverse to said common axis and each interposed between the adjacent faces of the two blocks of each of said sets.

5. A resilient coupling device according to claim 2, further including abutments interposed between the remote faces of two resilient blocks belonging respectively to one set and to the next set, said abutments being alternately rigid with one of said flange discs and with the other.

References Cited

UNITED STATES PATENTS

| | | | |
|---|---|---|---|
| 2,457,507 | 12/1948 | Strachovsky | 64—27 |
| 2,593,877 | 4/1952 | Hagenlocher | 64—13 |
| 3,023,593 | 3/1962 | Nallinger | 64—27 |
| 3,112,626 | 12/1963 | Barone | 64—11 |
| 3,120,745 | 2/1964 | Saurer | 64—14 |

FOREIGN PATENTS

| | | |
|---|---|---|
| 63,760 | 4/1955 | France. |
| | | (1st Addition No. 975,676) |
| 444,895 | 2/1949 | Italy. |
| 681,328 | 9/1939 | Germany. |

FRED C. MATTERN, Jr., Primary Examiner

M. A. ANTONAKAS, Assistant Examiner

U.S. Cl. X.R.

64—27